US011886862B2

(12) United States Patent
Sumcad et al.

(10) Patent No.: US 11,886,862 B2
(45) Date of Patent: Jan. 30, 2024

(54) VEHICLE SOFTWARE UPDATING TECHNIQUE

(71) Applicant: GM GLOBAL TECHNOLOGY OPERATIONS LLC, Detroit, MI (US)

(72) Inventors: Anthony J. Sumcad, Rochester Hills, MI (US); Russell A. Patenaude, Macomb Township, MI (US); Christopher L Oesterling, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 144 days.

(21) Appl. No.: 17/590,124

(22) Filed: Feb. 1, 2022

(65) Prior Publication Data

US 2023/0289166 A1  Sep. 14, 2023

(51) Int. Cl.
*G06F 8/65* (2018.01)
*B60W 50/00* (2006.01)
*G06F 8/71* (2018.01)

(52) U.S. Cl.
CPC ............... *G06F 8/65* (2013.01); *B60W 50/00* (2013.01); *B60W 2050/0083* (2013.01)

(58) Field of Classification Search
CPC ............ G06F 8/65; G06F 8/71; B60W 50/00; B60W 2050/0083; H04W 8/24; H04W 4/40
See application file for complete search history.

(56) References Cited

U.S. PATENT DOCUMENTS

| | | | | |
|---|---|---|---|---|
| 6,493,871 | B1* | 12/2002 | McGuire | G06F 8/65 |
| | | | | 717/172 |
| 10,102,687 | B1* | 10/2018 | Sampigethaya | G06Q 50/30 |
| 11,669,323 | B2* | 6/2023 | Harata | B60W 50/00 |
| | | | | 717/169 |
| 2012/0324435 | A1* | 12/2012 | Somani | G06F 8/30 |
| | | | | 717/170 |
| 2015/0178063 | A1* | 6/2015 | Narkinsky | G06F 8/658 |
| | | | | 717/168 |
| 2017/0060559 | A1* | 3/2017 | Ye | G06F 8/65 |

(Continued)

FOREIGN PATENT DOCUMENTS

CN  114692095 A  * 7/2022

*Primary Examiner* — Daxin Wu
(74) *Attorney, Agent, or Firm* — Quinn IP Law

(57) ABSTRACT

A system includes a source vehicle and a destination vehicle. The destination vehicle is configured to determine that the source vehicle and the destination vehicle are suitably close to exchange data through a wireless communications channel, compare current version numbers in the destination vehicle with approved version numbers in the source vehicle, approve an update for one or more current software components in the destination vehicle in response to one or more criteria, receive one or more approved software components at the destination vehicle from the source vehicle via the wireless communications channel in response to the current version numbers of the current software components approved for the update being different from corresponding ones of approved version numbers of the approved software components, and update the one or more current software components in the destination vehicle with the one or more approved software components received from the source vehicle.

20 Claims, 4 Drawing Sheets

(56) References Cited

U.S. PATENT DOCUMENTS

| | | | |
|---|---|---|---|
| 2017/0242679 A1* | 8/2017 | Sangameswaran | G06F 8/65 |
| 2018/0107473 A1* | 4/2018 | Ahmed | G06F 8/654 |
| 2019/0108010 A1* | 4/2019 | Tillman | H04L 67/12 |
| 2021/0072968 A1* | 3/2021 | Mezaael | G06F 8/65 |
| 2021/0109733 A1* | 4/2021 | Brugman | H04L 67/34 |
| 2021/0117176 A1* | 4/2021 | Watt | G06F 8/65 |
| 2021/0286610 A1* | 9/2021 | Chen | G06F 8/71 |
| 2022/0334826 A1* | 10/2022 | Iyer | G06F 8/71 |
| 2023/0021634 A1* | 1/2023 | He | H04L 41/20 |

* cited by examiner

VEHICLE SOFTWARE UPDATING TECHNIQUE

INTRODUCTION

The present disclosure relates to a system and a method for a vehicle software updating technique.

BACKGROUND

Modern vehicles are becoming more sophisticated by incorporating increasing amounts of complex electronics. The complex electronics often incorporates software that can be adjusted as improvements are made and errors are corrected. Issues arise when a vehicle has not been brought in for service over extended periods. Some vehicle owners may not realize that updates are available and thus do not take advantage of the updates. Other vehicle owners may utilize service stations that lack reliable access to the updates.

Accordingly, those skilled in the art continue with research and development efforts in the field of vehicle software updating when connectivity is not readily available and/or unreliable.

SUMMARY

A system is provided herein. The system includes a source vehicle and a destination vehicle. The source vehicle is configured to store a plurality of approved software components and a plurality of approved version numbers. The destination vehicle includes a transceiver, a plurality of circuits, a plurality of current software components installed within the plurality of circuits, and a plurality of current version numbers of the plurality of current software components. The destination vehicle is configured to determine that the source vehicle and the destination vehicle are suitably close to exchange data through the transceiver via a wireless communications channel, compare the plurality of current version numbers in the destination vehicle with the plurality of approved version numbers in the source vehicle, approve an update for one or more of the plurality of current software components in response to one or more criteria, receive one or more of the plurality of approved software components at the destination vehicle from the source vehicle via the wireless communications channel in response to the plurality of current version numbers of the plurality of current software components approved for the update being different from corresponding ones of the plurality of approved version numbers, and update the one or more current software components in the destination vehicle with the one or more approved software components received from the source vehicle.

In one or more embodiments of the system, the one or more criteria includes one or more manual selections of the plurality of current software components to be updated.

In one or more embodiments of the system, the one or more criteria includes one or more of a bandwidth of the wireless communications channel, a source throughput of the source vehicle to transmit the plurality of approved software components, a destination throughput of the destination vehicle to receive the plurality of approved software components and perform the update, a time available to perform the update, and a priority among the plurality of approved software components.

In one or more embodiments of the system, the destination vehicle is further configured to transfer to the source vehicle a list of the plurality of current software components and the plurality of approved software components installed in the destination vehicle after the update has finished, and the source vehicle is further configured to transfer the list to a repository external to the source vehicle.

In one or more embodiments of the system, the list includes a plurality of part numbers of the plurality of circuits in the destination vehicle.

In one or more embodiments of the system, at least one of the plurality of approved software components comprises code executable in at least one of the plurality of circuits in the destination vehicle.

In one or more embodiments of the system, at least one of the plurality of approved software components comprises calibration information utilized in at least one of the plurality of circuits in the destination vehicle.

In one or more embodiments of the system, the source vehicle is further configured to transfer to the destination vehicle a lighting condition within the source vehicle, and the destination vehicle is further configured to automatically apply the lighting condition received from the source vehicle.

In one or more embodiments of the system, the reception of one or more of the plurality of approved software components at the destination vehicle is in response to the source vehicle and the destination vehicle matching each other in make, model, and year.

A method for vehicle software updates is provided herein. The method includes storing in a source vehicle a plurality of approved software components and a plurality of approved version numbers, and moving one or more of the source vehicle and a destination vehicle suitably close to each other. The destination vehicle includes a transceiver, a plurality of circuits, a plurality of current software components installed within the plurality of circuits, and a plurality of current version numbers of the plurality of current software components. The method further includes determining that the source vehicle and the destination vehicle are suitably close to exchange data through the transceiver via a wireless communications channel, comparing the plurality of current version numbers in the destination vehicle with the plurality of approved version numbers in the source vehicle, approving an update for one or more of the plurality of current software components in response to one or more criteria, receiving one or more of the plurality of approved software components at the destination vehicle from the source vehicle via the wireless communications channel in response to the plurality of current version numbers of the plurality of current software components approved for the update being different from corresponding ones of the plurality of approved version numbers, and updating the one or more current software components in the destination vehicle with the one or more approved software components received from the source vehicle.

In one or more embodiments of the method, the one or more criteria includes one or more manual selections of the plurality of current software components to be updated.

In one or more embodiments of the method, the one or more criteria includes one or more of a bandwidth of the wireless communications channel, a source throughput of the source vehicle to transmit the plurality of approved software components, a destination throughput of the destination vehicle to receive the plurality of approved software components and perform the updating, a time available to perform the updating, and a priority among the plurality of approved software components.

In one or more embodiments, the method further includes transferring from the destination vehicle to the source vehicle a list of the plurality of current software components and the plurality of approved software components installed in the destination vehicle after the update has finished, and transferring the list from the source vehicle to a repository external to the source vehicle.

In one or more embodiments of the method, the list includes a plurality of part numbers of the plurality of circuits in the destination vehicle.

In one or more embodiments of the method, at least one of the plurality of approved software components comprises code executable in at least one of the plurality of circuits in the destination vehicle.

In one or more embodiments of the method, at least one of the plurality of approved software components comprises calibration information utilized in at least one of the plurality of circuits in the destination vehicle.

In one or more embodiments, the method further includes transferring from the source vehicle to the destination vehicle a lighting condition within the source vehicle, and automatically applying in the destination vehicle the lighting condition received from the source vehicle.

A vehicle is provided herein. The vehicle includes a transceiver, a plurality of circuits, a plurality of current software components installed within the plurality of circuits, a plurality of current version numbers of the plurality of current software components, and a vehicle task manager. The transceiver is configured to exchange data with a source vehicle via a wireless communications channel. The vehicle task manager is configured to determine that the source vehicle and the vehicle are suitably close to exchange data through the transceiver via the wireless communications channel. The source vehicle is configured to store a plurality of approved software components and a plurality of approved version numbers. The vehicle task manager is further configured to compare the plurality of current version numbers in the vehicle with the plurality of approved version numbers in the source vehicle, approve an update for one or more of the plurality of current software components in response to one or more criteria, receive one or more of the plurality of approved software components at the vehicle from the source vehicle via the wireless communications channel in response to the plurality of current version numbers of the plurality of current software components approved for the update being different from corresponding ones of the plurality of approved version numbers, and update the one or more current software components in the vehicle with the one or more approved software components received from the source vehicle.

In one or more embodiments, the vehicle is further configured to transfer to the source vehicle a list of the plurality of current software components and the plurality of approved software components installed in the vehicle after the update has finished.

In one or more embodiments of the vehicle, the list includes a plurality of part numbers of the plurality of circuits in the vehicle.

The above features and advantages and other features and advantages of the present disclosure are readily apparent from the following detailed description of the best modes for carrying out the disclosure when taken in connection with the accompanying drawings.

DETAILED DESCRIPTION

Embodiments, of the present disclosure generally provide a system and a method for a vehicle software updating technique. Vehicle-to-vehicle (V2V) connections and vehicle-to-infrastructure (V2I) connections may be used to transfer approved software components into the field for updating destination vehicles already in the field with current software components. In situations where the destination vehicles are sufficiently close to a repository of the approved software components, the updates take place by transmitting the approved software components from the repository directly to the destination vehicles via wireless communications networks and/or wired communications networks (e.g., a vehicle-to-infrastructure connection or an over-the-air connection). In situations where the destination vehicles are too far from the repositories to connect via the wireless communications networks, one or more source (or seed) vehicles may be initially updated and moved closer to the destination vehicles. The approved software components in the source vehicles may be transferred via a wireless communications network (e.g., a vehicle-to-vehicle connection) from the source vehicles to the destination vehicles.

After selected approved software components are received in a particular destination vehicle, one or more of the approved software components are used to update the current components in the particular destination vehicle. In certain situations, the update may involve changing every software component in the particular destination vehicle. In other situations, the update may involve changing as few as a single software component in the particular destination vehicle. An update may include full replacement of a current software component, a revision of the current software component, or a removal of the current software component. Some software components may involve code that is executable in the electronic control modules of the vehicles. Other software components may involve calibration information, configuration information, performance information, manifests, infotainment systems catalogs, and the like.

Figure 1:
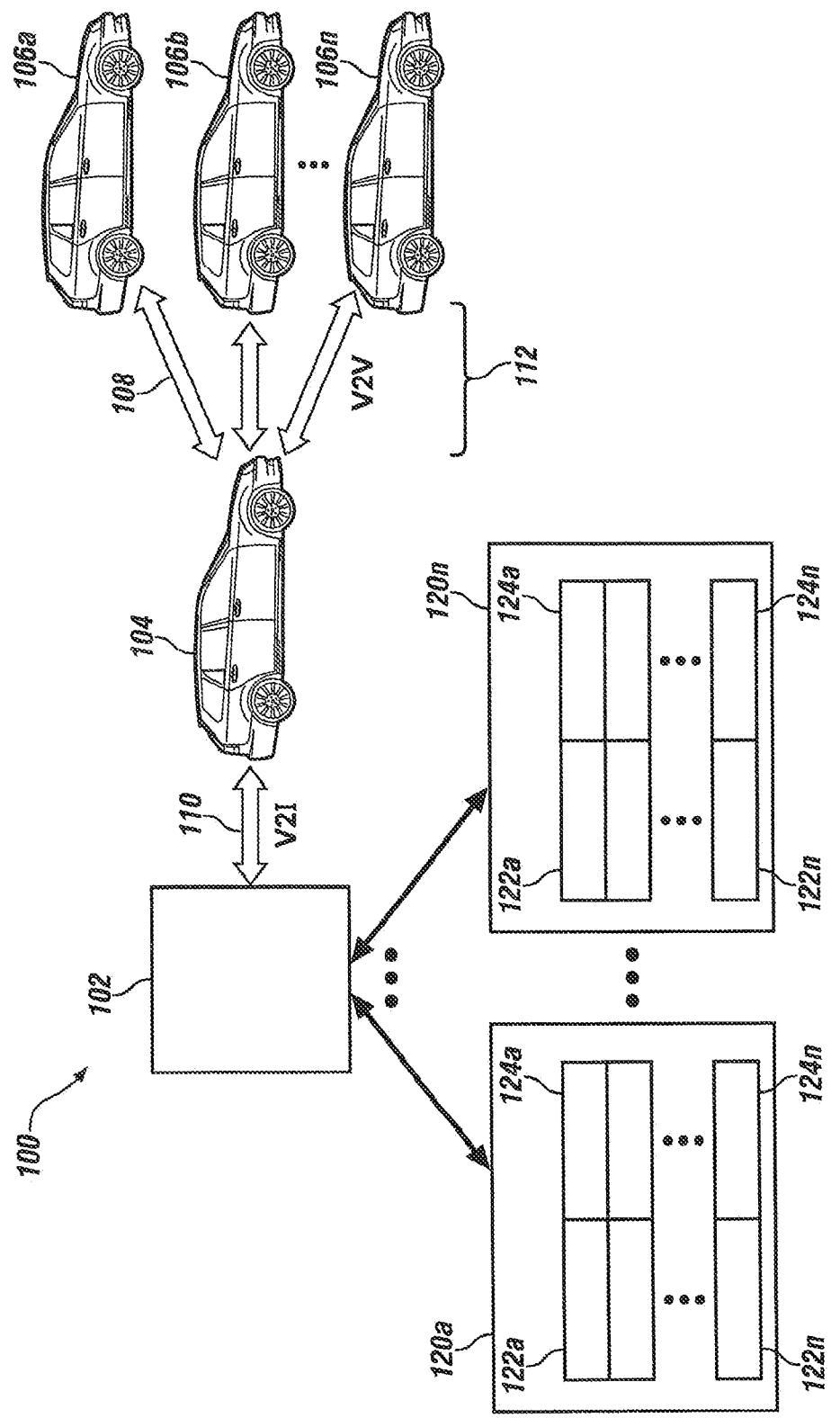
FIG. 1 is a schematic diagram of a system in accordance with one or more exemplary embodiments.

Referring to FIG. 1, a schematic diagram of a system 100 is shown in accordance with one or more exemplary embodiments. The system 100 generally includes a repository 102, one or more source vehicles (one shown) 104, one or more destination vehicles 106a-106n, a wireless communications channel 108, and an optional wired communications channel 110. The source vehicle 104 may move between near the repository 102 and near the destination vehicles 106a-106n. While remote from the repository 102 (e.g., up to several miles away), a separation distance 112 (e.g., generally less than a mile) may exist between the source vehicle 104 and one or more of the destination vehicles 106a-106n.

The repository 102 may store multiple component sets 120a-120n of software components. Each component set 120a-120n may be suitable for use in the vehicles 104 and 106a-106n of a particular make, model, and year. Each component set 120a-120n may include multiple approved software components 122a-122n. Each approved software component 122a-122n may have a respective approved version number 124a-124n.

The repository 102 implements a storage facility. The repository 102 may be a building, a mobile platform, a computer, a communications network, or the like. The repository 102 is operational to store the component sets 120a-120n and transmit one or more of the approved software components 122a-122n and one or more corresponding approved version numbers 124a-124n via the wireless communications channel 108 and/or the wired communications channel 110 directly to the vehicles 104 and/or 106a-106n.

The source vehicle 104 implements a mobile vehicle. The source vehicle 104 may include, but is not limited to a passenger car, a motorcycle, a truck, a bus, a sports utility vehicle, a recreational vehicle, a construction vehicle, a train, a marine vessel, an aircraft, and farm equipment. Other vehicles may be implemented to meet a design criteria of a particular application.

The source vehicle 104 is operational to receive and store the approved software components 122a-122n and the approved version numbers 124a-124n for one or more component sets 120a-120n from the repository 102. In various embodiments, the source vehicle 104 may update internal software components using the approved software components 122a-122n of a compatible component set 120a-120n as received from the repository 102. In some embodiments, the source vehicle 104 may store one or more of the component sets 120a-120n without using the approved software components 122a-122n contained therein.

The source vehicle 104 is operational to establish vehicle-to-vehicle connections with one or more destination vehicle 106a-106n while the source vehicle 104 is within the separation distance 112 from the destination vehicles 106a-106n. The separation distance 112 is generally based on a longest distance over which the wireless communications channel 108 operates. Once the connections have been established, the source vehicle 104 communicates with the destination vehicles 106a-106n to determine which of the component sets 120a-120n are suitable to update the destination vehicles 106a-106n. The source vehicle 104 subsequently transmits the approved version numbers 124a-124n and one or more of the approved software components 122a-122n of the suitable component sets 120a-120n to the destination vehicles 106a-106n.

After the destination vehicles 106a-106n have updated, the source vehicle 104 may receive a respective list from each updated destination vehicle 106a-106n. The lists generally identify the current software components that were not updated in the destination vehicles 106a-106n, and the approved software components 122a-122n that were used to update the destination vehicles 106a-106n. The lists may also include, but are not limited to, vehicle identification numbers, circuit identification numbers, vehicle mileage, diagnostic results, and the like.

The destination vehicles 106a-106n implement mobile vehicles. The destination vehicles 106a-106n may include, but are not limited to passenger cars, motorcycles, trucks, busses, sports utility vehicles, recreational vehicles, construction vehicles, trains, marine vessels, aircraft, and farm equipment. Other vehicles may be implemented to meet a design criteria of a particular application.

The destination vehicles 106a-106n are operational to receive the approved version number 124a-124n and one or more approved software components 122a-122n of an appropriate component set 120a-120n. The destination vehicles 106a-106n are also operational to compare the approved version numbers 124a-124n with current version numbers of the current software components installed internally. The destination vehicles 106a-106n may subsequently update one or more current software components with the one or more approved software components 122a-122n based on the criteria.

Selection between a full update and a partial update is based on the criteria. The criteria may include, but is not limited to, one or more manual selections of which current software components are to be updated, a bandwidth of the wireless communications channel 108, a bandwidth of the wired communications channel 110, a source throughput of the source vehicle 104 to transmit the approved software components 122a-122n, a destination throughput of the destination vehicle 106a-106n to receive the approved software components 122a-122n and perform the update, a time available to perform the update, and a priority among the approved software components 122a-122n. Other criteria may be implemented to meet the design criteria of a particular application. By way of example, where time and bandwidth are plentiful, the destination vehicles 106a-106n may receive the approved software components 122a-122n and perform a full update. In another example where time is limited, the destination vehicles 106a-106n may receive a few highest-priority approved software components 122a-122n and perform a partial update.

Once a destination vehicle 106a-106n has completed an update, the destination vehicle 106a-106n may generate and transmit a corresponding list back to the source vehicle 104. The source vehicle 104 may transmit the lists to the repository 102 the next time the repository 102 is within range for an over-the-air transmission. The repository 102 transfers the lists to an appropriate location (e.g., a data center) for analysis. The analysis may determine the current status of the vehicles 104 and 106a-106n, how much time has lapsed since a newly approved component set 120a-120n is available until some percentage of the fleet of vehicles 104 and 106a-106n has been updated to the newly approved component set 120a-120n, configuration histories of the vehicles 104 and 106a-106n, where opportunities exist to share, show, and/or sell new or improved features, and risk analysis tied to outdated or uncertain software components.

The wireless communications channel 108 implements one or more wireless networks. The wireless communications channel 108 operates on one or more different standards or protocols such as, but not limited to, Wideband Code Division Multiple Access (WCDMA), Long-Term Evolution (LTE), 3rd Generation Partnership Project (3GPPP) and/or 5th Generation (5G) cellular. The wireless communication is performed according to one or more wireless protocols, such as any of the IEEE 802.11 protocols, Worldwide Interoperability for Microwave Access (WiMAX), and/or Bluetooth. The wireless communications channel 108 supports vehicle-to-everything (V2X) connections, the vehicle-to-vehicle connections, and/or the vehicle-to-infrastructure connections.

The wired communications channel 110 implements one or more wired networks. The wired communications channel 110 operates on one or more different standards such as, but not limited to, Ethernet, Internet, USB and/or FireWire. The wired communications channel 110 may involve an onboard diagnostics (OBD) port and/or a Tech-2 tool port. Other wired communications standards may be implemented to meet the design criteria of a particular application.

Figure 2:
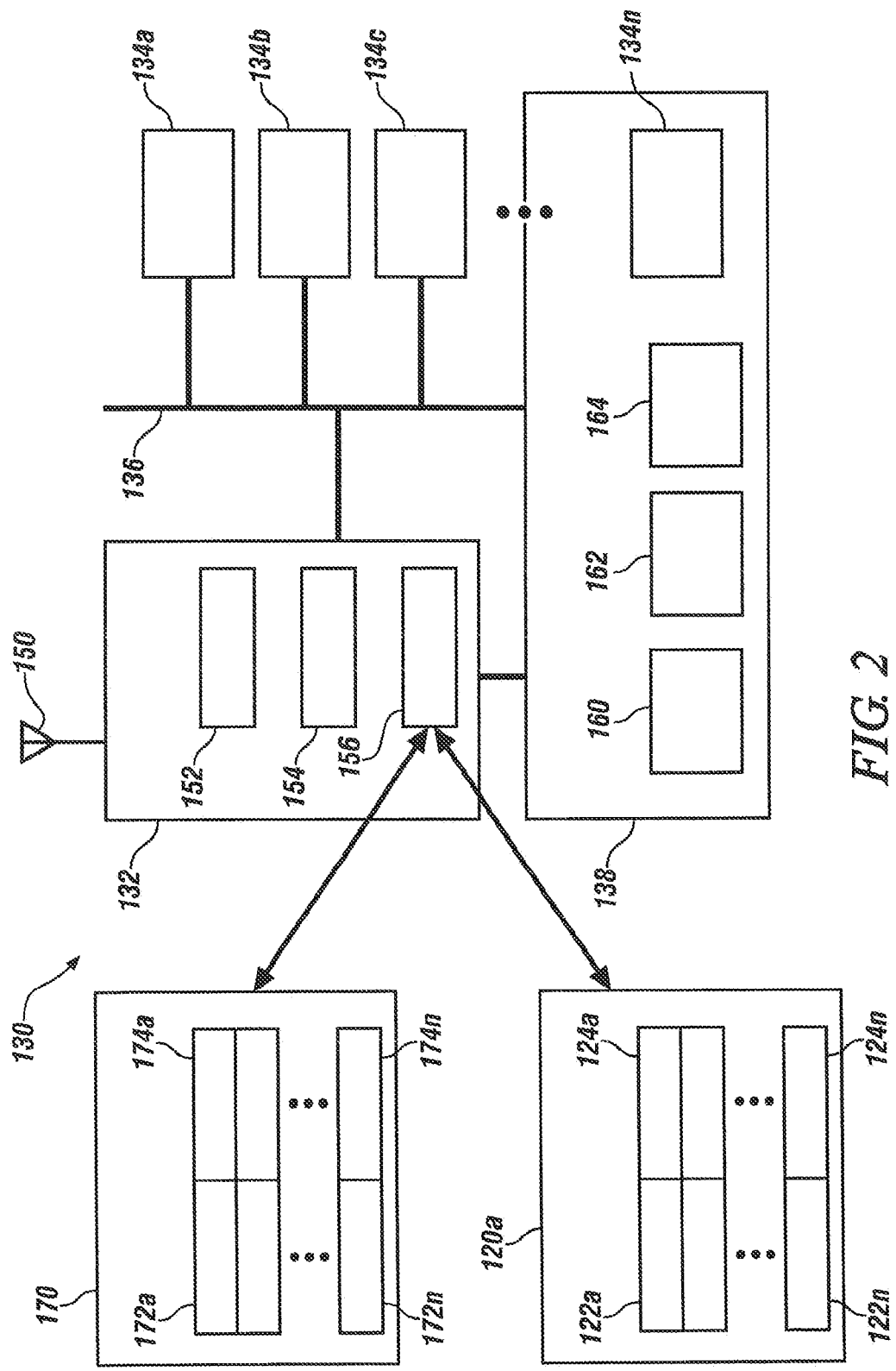
FIG. 2 is a schematic diagram of a vehicle in accordance with one or more exemplary embodiments.

Referring to FIG. 2, a schematic diagram of an example implementation of a vehicle 130 is shown in accordance with one or more exemplary embodiments. The vehicle 130 illustrated may be representative of the source vehicle 104 and the destination vehicles 106a-106n. The vehicle 130 generally includes a telematics control platform 132, multiple circuits 134a-134n, a vehicle bus 136, and an infotainment system 138. The telematics control platform 132 may include an antenna 150, a transceiver 152, one or more processors (one shown) 154, and a memory 156. The infotainment system 138 includes one or more displays (one shown) 160, one or more speakers (one shown) 162, multiple buttons (one shown) 164, and one or more of the circuits 134a-134n (e.g., 134n)

The telematics control platform 132 implements a transceiver device that enables wireless voice and/or data communication over the wireless communications channel 108 and/or the wired communications channel 110. The wireless/wired communication enables the vehicle 130 to communicate with repository 102, other telematics-enabled vehicles 104 and 106a-106n, and/or other devices.

The circuits 134a-134n implement a variety of electronic control modules in the vehicle 130. The individual circuits 134a-134n are operational to control various aspects of engine operation, such as fuel ignition and ignition timing. Some of the circuits 134a-134n regulate operations of one or more components of the vehicle powertrain, and govern various electrical components, such as power door locks and headlights. Other circuits 134a-134n perform onboard diagnostics that provide a myriad of real-time data, such as that received from various sensors including vehicle emissions sensors, and generate a standardized series of diagnostic trouble codes that allow a technician to rapidly identify and remedy malfunctions within the vehicle 130. The circuits 134a-134n may perform other functions to meet the design criteria of a particular application.

One or more of the circuits 134a-134n may utilize the current software components 172a-172n during normal operation. The circuits 134a-134n that use the current software components 172a-172n may be individually updated with the approved software components 122a-122n and the approved version numbers 124a-124n previously loaded into the memory 156. The telematics control platform 132 may request that the circuits 134a-134n report the loaded current version numbers 174a-174n and approved version numbers 124a-124n as a snapshot of current configurations of the circuits 134a-134n. The telematics control platform 132 may also request that each circuit 134a-134n report a respective hardware part number and diagnostics information as part of the snapshot.

The vehicle bus 136 implements an onboard communication bus. The vehicle bus 136 connects to the telematics control platform 132, the circuits 134a-134n, and the infotainment system 138. Data may be exchanged among the telematics control platform 132, the circuits 134a-134n, and the infotainment system 138 via the vehicle bus 136. In various embodiments, the vehicle bus 136 implements one or more of a controller area network (CAN) bus, a WIFI bus, a Bluetooth bus, a Bluetooth Low Energy bus, a media oriented system transfer (MOST) bus, a local interconnection network, a local area network, an Ethernet bus, and/or other busses that conform with known International Organization for Standardization (ISO), SAE International, and the like. In various embodiments, communications via the vehicle bus 136 may also be available through the onboard diagnostics port and/or the Tech-2 tool port.

The infotainment system 138 implements a human machine interface configured to present information to users (or people) within the vehicle 130, and receive inputs from the users. The infotainment system 138 may include one or more of the circuit 134a-134n, the displays 160, the speakers 162, and the buttons 164. The infotainment system 138 is operational to provide information-related services such as onboard video camera images, vehicle features, music, web pages, movies, television programs, video games and the like. Visual information generated by the infotainment system 138 may be presented via the display 160. Audio information generated by the infotainment system 138 may be presented via the speakers 162. Manual user inputs may be received via the buttons 164.

The antenna 150 implements a radio-frequency antenna. The antenna 150 is coupled to the transceiver 152. The antenna 150 is operational to provide a bidirectional exchange of data between the vehicle 130 and the source vehicle 104 and the repository 102. In some situations, the antenna 150 may receive the component sets 120a-120n used to update the vehicle 130. In other situations, the antenna 150 may transmit the lists generated within the vehicle 130 back to the source vehicle 104 and/or the repository 102.

The transceiver 152 implements a bidirectional wireless and/or wired communication device. The transceiver 152 utilizes cellular communication according to standards such as LTE or 5G and thus includes the transceiver 152 for data transmission and reception via the antenna 150. The transceiver 152 may be configured to communicate according to one or more wireless protocols, such as any of the IEEE 802.11 protocols, WiMAX, Bluetooth, 3GPPP, and Transmission Control Protocol/Internet Protocol (TCP/IP).

The processor 154 implements processing circuitry capable of processing electronic instructions including microprocessors, microcontrollers, host processors, controllers, vehicle communication processors, and application specific integrated circuits (ASICs). The processor 154 may be a dedicated processor used only for the telematics control platform 132 or shared with other vehicle systems. The processor 154 executes diverse types of digitally-stored instructions, such as software programs and/or firmware programs stored in the memory 156, which enable the telematics control platform 132 to provide a variety of services.

The memory 156 implements a storage device. The memory 156 includes nonvolatile and volatile computer readable memory. The memory 156 is configured to receive and store a current component set 170 and a component set 120a-120n (e.g., 120a) suitable for the circuits 134a-134n in the vehicle 130. The current component set 170 includes current software components 172a-172n and corresponding current version numbers 174a-174n. The current software components 172a-172n are installed in the circuits 134a-134n prior to the update. The component set 120a includes the approved software components 122a-122n and the corresponding approved version number 124a-124n. The approved software components 122a-122n are used to update the current software components 172a-172n.

Figure 3:
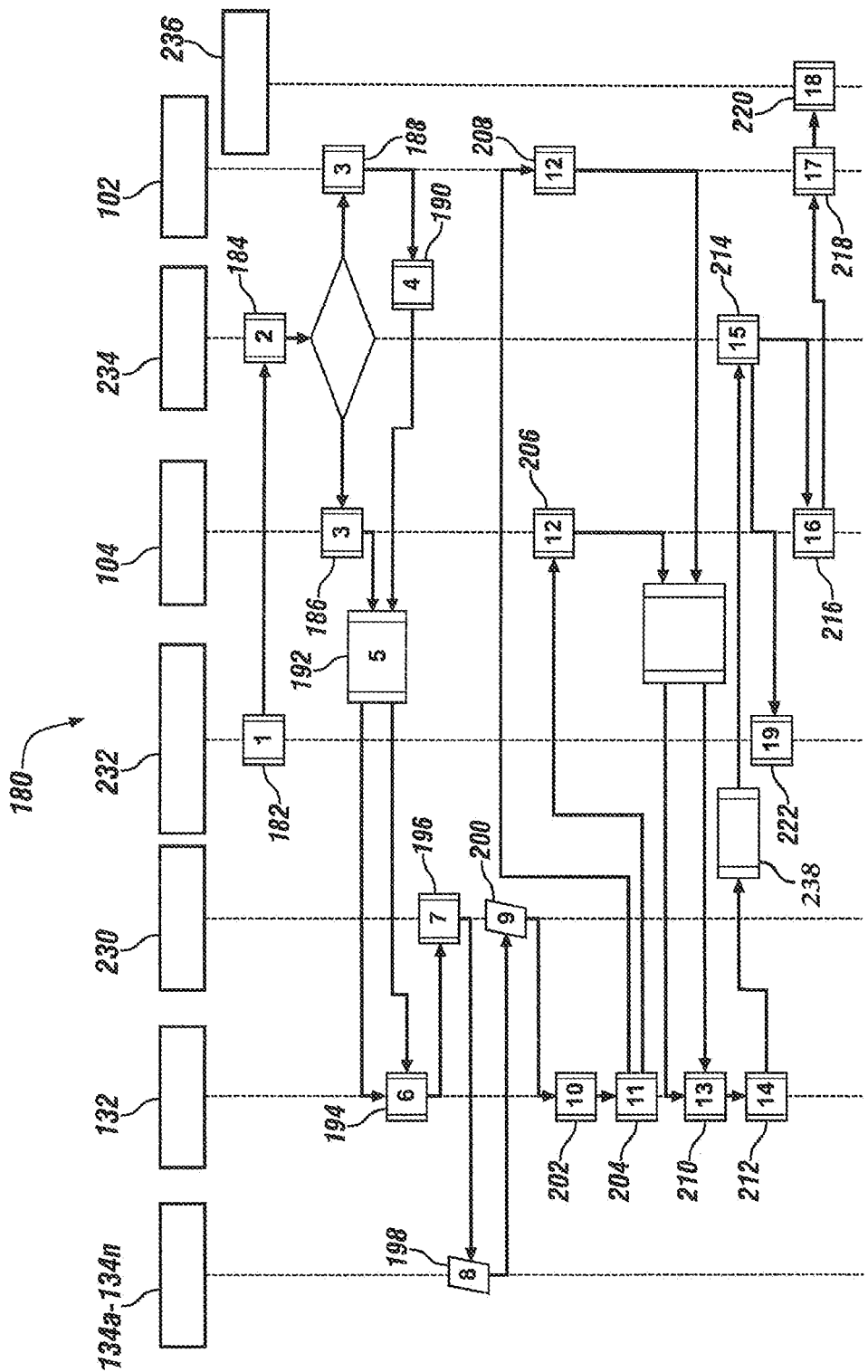
FIG. 3 is a schematic diagram of an update sequence in accordance with one or more exemplary embodiments.

Referring to FIG. 3, a schematic diagram of an example update sequence 180 is shown in accordance with one or more exemplary embodiments. The sequence 180 is performed by the system 100. The sequence 180 includes steps 182 to 214, as illustrated. The order of the steps is shown as a representative example. Other step orders may be implemented to meet the criteria of a particular application.

The system 100 may include a vehicle task manager 230, a handheld device 232, a web application 234, and a back office 236. The vehicle task manager 230 is implemented in the vehicle 130 and is configured to execute various sequences of tasks, such as updating the current software components 172a-172n. The vehicle task manager 230 may include one or more applications that implement a set of protocols for conditions and actions enabling if-this-then-that (IFTT) or similar processes.

In various embodiments, the handheld device 232 implements a smart telephone, a tablet, a laptop computer, a notebook, or other similar device capable of bidirectional communication with the telematics control platform 132. The handheld device 232 is operational to receive inputs from the user, present information to the user, and store data. In other embodiments, the functionality of the handheld device 232 may be implemented in the electronics (e.g., the processor 154, the memory 156, the display 160, the speakers 162, and the buttons 164) within the vehicle 130.

The web application 234 implements software that controls the transfer of data to and from the vehicle 130 for the purposes of updating the current software components 172a-172n. In various embodiments, the web application 234 may reside in the source vehicle 104. In other embodiments, the web application 234 may reside in the repository 102.

The back office 236 implements one or more offices of the company or organization responsible for maintaining the system 100. The back office 236 is operational to collect historical records of the vehicles 104 and 106a-106n. In some embodiments, the back office 236 also provides marketing and sales activities.

Updating the vehicle 130 generally begins at the step 182 where the handheld device 232 issues a request for update to the web application 234. The request may include identification information (e.g., a vehicle identification number, the make, model, and year, and/or the like) of the vehicle 130. The web application 234 determines a connection type (e.g., a "local" connection to a nearby source vehicle 104 or a "remote" connection to the repository 102) in the step 184 and passes the request for update to the source vehicle 104 or the repository 102. The source vehicle 104 determines an appropriate component set 120a-120n for the vehicle 130 (e.g., the destination vehicles 106a-106n) in the step 186 based on the identification information and the connection type determined in the step 184. The repository 102 determines an appropriate one or more component sets 120a-120n for the vehicle 130 (e.g., a source vehicle 104) in the step 188. Where the vehicle 130 is a source vehicle 104 proximate the repository 102, the source vehicle 104 may move in the step 190 into the field to within the separation distance 112 of one or more destination vehicles 106a-106n.

The approved version numbers 124a-124n are transmitted in the step 192 to the vehicle 130. In the step 194, the telematics control platform 132 sets a task for the vehicle task manager 230 to poll the telematics control platform 132 and the circuits 134a-134n of the vehicle 130. The vehicle task manager 230 polls the telematics control platform 132 and the circuits 134a-134n that utilize the current software components 172a-172n in the step 196. The telematics control platform 132 and each circuit 134a-134n that utilizes the current software components 172a-172n responds to the poll by identifying in the step 198 the current version numbers 174a-174n of the current software components 172a-172n that are installed. The current version numbers 174a-174n are reported back to the vehicle task manager 230.

In the step 200, the vehicle task manager 230 accumulates the current version numbers 174a-174n and notifies the telematics control platform 132 that the polling is complete. The telematics control platform 132 compares the current version numbers 174a-174n with the approved version numbers 124a-124n in the step 202 to determine which among the current software components 172a-172n may be updated, notifies the user of the differences, and prompts for interest in updating the vehicle 130. No updates may be appropriate where the current version number 174a-174n matches a corresponding approved version number 124a-124n.

In the step 204, a selection of one or more approved software components 122a-122n to be used in the update is made by the telematics control platform 132. The selection is generally based on one or more criteria. The criteria include, but are not limited to one or more manual selections from the user, a bandwidth of the wireless communications channel 108, a bandwidth of the wired communications channel 110, a source throughput of the source vehicle 104 to transmit the approved software components 122a-122n, a destination throughput of the destination vehicle 106a-106n to receive the approved software components 122a-122n and perform the update, a time available to perform the update, and a priority among the approved software components 122a-122n. In the case of a fleet owner, a group of destination vehicles 106a-106n may be updated to the same configuration concurrently. In the cases where multiple owners are involved, each destination vehicle 106a-106n may undergo a unique update based on unique selections.

Where the vehicle 130 is a destination vehicle 106a-106n, the source vehicle 104 transfers the selected approved software components 122a-122n to the vehicle 130 in the step 206. Where the vehicle 130 is the source vehicle 104, the repository 102 transfers the selected approved software components 122a-122n to the vehicle 130 in the step 208. The received approved software components 122a-122n are installed into the telematics control platform 132 and the appropriate circuits 134a-134n the step 210.

In the step 212, the telematics control platform 132 generates a list of a post-update configuration of the vehicle 130 and transfers the list to the web application 234. The list may include, but is not limited to, the approved software components 122a-122n just installed, the current software components 172a-172n that are still present in the vehicle 130 (e.g., not updated), the part numbers of the circuits 134a-134n and the telematics control platform 132. The list may be stored locally within the telematics control platform 132 and/or handheld device 232. In the step 214, the web application 234 compares the list against at least the approved version numbers 124a-124n and timestamps the comparison to create a historical record of what hardware and software components are in the vehicles 104 and 106a-106n. If the web application 234 is part of the source vehicle 104, the source vehicle 104 may be moved in the step 216 near to the repository 102. In the step 218, the historical records are stored in the repository 102. In various embodiments, the repository 102 may subsequently transfer the historical records to the back office 236 in the step 220.

Figure 4:
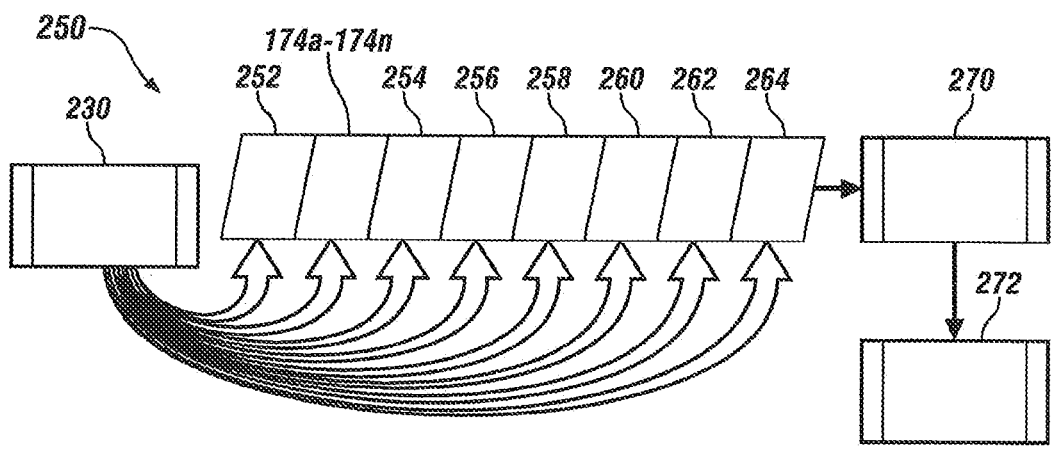
FIG. 4 is a schematic diagram of a polling operation in accordance with one or more exemplary embodiments.

Referring to FIG. 4, a schematic diagram of an example polling 250 is shown in accordance with one or more exemplary embodiments. The polling 250 is implemented by the circuits 134a-134n, the telematics control platform 132, and the vehicle task manager 230. The telematics control platform 132 sets the polling task in the vehicle task manager 230 that subsequently requests the telematics control platform 132 and the circuits 134a-134n to provide information via the vehicle bus 136. Calibration information 252, current versions numbers 174a-174n of the current software components 172a-172n, configuration information 254, manifest information 256, infotainment catalog information 258, hardware part number information 260, module version information 262, performance information 264, and the like, are returned to the vehicle task manager 230. The information is stored 270 in a vehicle data hub within the telematics control platform 132. Copies of the information may be transmitted 272 to the source vehicle 104 and/or the repository 102.

Figure 5:
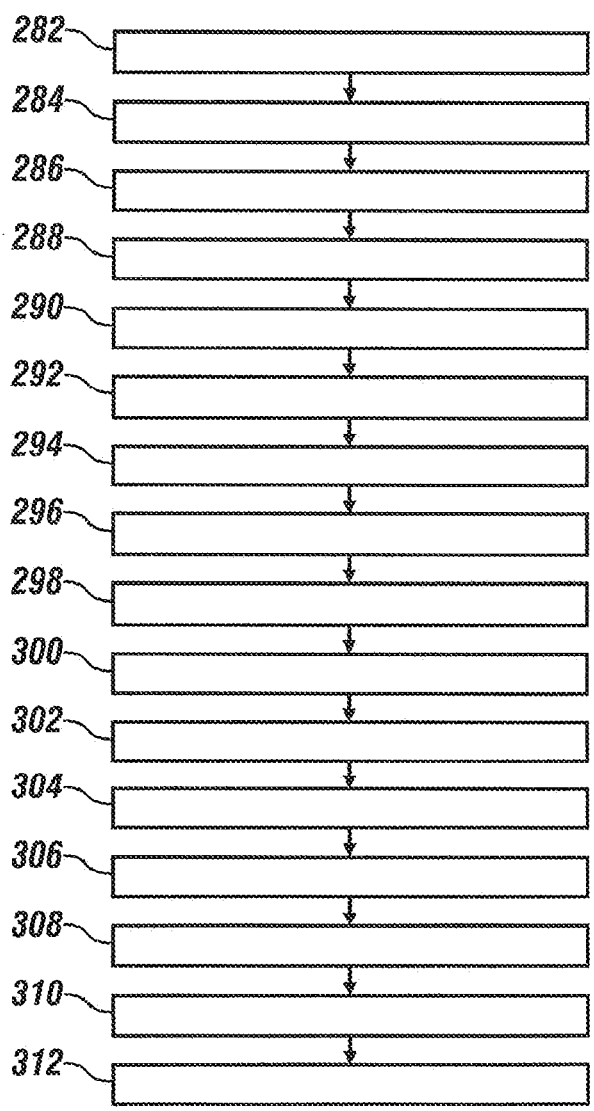
FIG. 5 is a flow diagram of a method for vehicle-to-vehicle software updates in accordance with one or more exemplary embodiments.

Referring to FIG. 5, a flow diagram of an example method 280 for vehicle-to-vehicle software updates is shown in accordance with one or more exemplary embodiments. The method (or process) 280 may be implemented in the system 100. The method 280 includes steps 282 to 312, as illustrated. The order of the steps is shown as a representative example. Other step orders may be implemented to meet the criteria of a particular application.

In the step 282, the approved software components 122a-122n and the approved version numbers 124a-124n are stored in the repository 102. The approved software components 122a-122n and the approved version numbers 124a-124n may be transferred in the step 284 from the repository 102 to the source vehicle 104 via the wireless communications channel 108 and/or the wired communications channel 110. The transferred approved software components 122a-122n and the approved version numbers 124a-124n are stored in source vehicle 104 in the step 286. The source vehicle 104 is moved in the step 288 from near the repository 102 to within the separation distance 112 of one or more destination vehicles 106a-106n.

In the step 290, the source vehicle 104 and/or the destination vehicles 106a-106n may determine that the source vehicle 104 and the destination vehicles 106a-106n are suitably close to exchange data through the corresponding transceivers 152 via the wireless communications channel 108. The destination vehicles 106a-106n may transfer requests to check for updates to the source vehicle 104 in the step 292. The requests may include the make, the model, and the year of the destination vehicles 106a-106n. The source vehicle 104 may transfer the approved version numbers 124a-124n to the destination vehicles 106a-106n in the step 294. In some embodiments, the source vehicle 104 may also transfer a lighting condition (e.g., normal lighting or blackout lighting) to the destination vehicles 106a-106n in the step 294.

In the step 296, each destination vehicle 106a-106n may automatically implement the lighting condition. In the step 298, each destination vehicle 106a-106n compares the current version numbers 174a-174n currently installed with the approved version numbers 124a-124n received from the source vehicle 104. The comparison identifies which among the current software components 172a-172n could be updated. Each destination vehicle 106a-106n checks for update criteria in the step 300. The criteria may include, but are not limited to, the manual selections of the current software components 172a-172n to be updated, the bandwidth of the wireless communications channel 108, the source throughput of the source vehicle 104 to transmit the approved software components 122a-122n, the destination throughput of the destination vehicles 106a-106n to receive the approved software components 122a-122n and perform the updates, the time available to perform the updates, and priorities among the approved software components 122a-122n.

In the step 302, each destination vehicle 106a-106n approves a respective update for one or more of the current software components 172a-172n in response to respective criteria. In various situations, the approved update may be the same among the destination vehicles 106a-106n. In other situations, each destination vehicle 106a-106n may select a distinct set of the approved software components 122a-122n for the respective updates. For example, one of the destination vehicles 106a-106n may have received an earlier partial update and so is limited in the current update, while another destination vehicle 106a-106n selects a full update. The destination vehicles 106a-106n receive the approved software components in the step 304 from the source vehicle 104 via the wireless communications channel 108. In the step 306, the destination vehicles 106a-106n apply the updates of the selected current software components 172a-172n with the corresponding approved software components 122a-122n received from the source vehicle 104.

In the step 308, the destination vehicles 106a-106n generate and transfer a respective list 238 of the vehicle configuration to the source vehicle 104 of the current software components 172a-172n (not updated) and the approved software components 122a-122n (just updated) that are currently installed in the destination vehicles 106a-106n after the updates have finished. The source vehicle 104 may move close to the repository 102 in the step 310. In the step 312, the source vehicle 104 transfers the lists 238 to the repository 102.

Each owner and each user of the vehicles 104 and 106a-106n has a record of when and what updates took place. A source vehicle 104, such as a passenger automobile, may update multiple destination vehicles 106a-106n of similar make, model and year where the source vehicle 104 carries a single component set 120a-120n. A source vehicle 104, such as a resupply truck, may update multiple destination vehicles 106a-106n of varying makes, models, and/or years where the source vehicle 104 carries multiple component sets 120a-120n. The resupply truck may be a vehicle that provides the updates and replenishes items that are consumed, used, and/or involve replacement.

The ability of the source vehicles 104 to travel out into the field, communicate with the destination vehicles 106a-106n, and subsequently return to a starting point enables the source vehicles 104 to retrieve module version information, calibration information, performance information, installed apps information, hardware part numbers, software version numbers, and other variable information that define a current configuration of each vehicle 104 and 106a-106n. The gathered information provides fleet owners of update options and captures histories of the additions/changes/deletions made from time to time. The history information enables tracking of how long an update takes place to convert some percentage of the destination vehicles 106a-106n from an initial version A to an updated version B, versus from the initial version A to another updated version C, where version C is newer than version B and version B is newer than version A.

Various embodiments of the system generally provides a repository, source vehicles, and destination vehicles. Each source vehicle is configured to store at least one component set of multiple approved software components and multiple approved version numbers. Each destination vehicle includes a transceiver, multiple circuits, and multiple current software components installed within the multiple circuits. The current software components have respective current version numbers. Each destination vehicle is configured to determine that the source vehicle and the destination vehicle are suitably close to exchange data through the transceiver via a wireless communications channel, compare the current version numbers in the destination vehicle with the approved version numbers in the source vehicle, and approve an update for one or more of the current software components in response to one or more criteria. The update generally involves the current software components having the current version numbers that are different from corresponding approved version numbers. Once the update is defined, each destination vehicle receives the appropriate approved software components from the source vehicle via the wireless communications channel. The destination vehicles subsequently update the one or more current software components in with the one or more approved software components received from the source vehicle. The technique described enables destination vehicles 106a-106n to receive updates without making appointments and spending time at a repair shop while the updates are applied.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A system comprising:
   a source vehicle configured to store a plurality of approved software components and a plurality of approved version numbers; and
   a destination vehicle comprising a transceiver, a plurality of circuits, a plurality of current software components installed within the plurality of circuits, and a plurality of current version numbers of the plurality of current software components, wherein the destination vehicle is configured to:
      determine that the source vehicle and the destination vehicle are suitably close to exchange data through the transceiver via a wireless communications channel;
      compare the plurality of current version numbers in the destination vehicle with the plurality of approved version numbers in the source vehicle;
      approve an update for one or more of the plurality of current software components in response to one or more criteria;
      receive one or more of the plurality of approved software components at the destination vehicle from the source vehicle via the wireless communications channel in response to the plurality of current version numbers of the plurality of current software components approved for the update being different from corresponding ones of the plurality of approved version numbers;
      update the one or more of the plurality of current software components in the destination vehicle with the one or more of the plurality of approved software components received from the source vehicle; and
      transfer to the source vehicle a list of the plurality of current software components and the plurality of approved software components installed in the destination vehicle after the update has finished.

2. The system according to claim 1, wherein the one or more criteria includes one or more manual selections of the plurality of current software components to be updated.

3. The system according to claim 1, wherein the one or more criteria includes one or more of a bandwidth of the wireless communications channel, a source throughput of the source vehicle to transmit the plurality of approved software components, a destination throughput of the destination vehicle to receive the plurality of approved software components and perform the update, a time available to perform the update, and a priority among the plurality of approved software components.

4. The system according to claim 1, wherein:
   the source vehicle is further configured to transfer the list to a repository external to the source vehicle.

5. The system according to claim 1, wherein the list includes a plurality of part numbers of the plurality of circuits in the destination vehicle.

6. The system according to claim 1, wherein at least one of the plurality of approved software components comprises code executable in at least one of the plurality of circuits in the destination vehicle.

7. The system according to claim 1, wherein at least one of the plurality of approved software components comprises calibration information utilized in at least one of the plurality of circuits in the destination vehicle.

8. The system according to claim 1, wherein:
   the source vehicle is further configured to transfer to the destination vehicle a lighting condition within the source vehicle; and
   the destination vehicle is further configured to automatically apply the lighting condition received from the source vehicle.

9. The system according to claim 1, wherein the reception of the one or more of the plurality of approved software components at the destination vehicle is in response to the source vehicle and the destination vehicle matching each other in make, model, and year.

10. A method for vehicle software updates comprising:
    storing in a source vehicle a plurality of approved software components and a plurality of approved version numbers;
    moving one or more of the source vehicle and a destination vehicle suitably close to each other, wherein the destination vehicle comprises a transceiver, a plurality of circuits, a plurality of current software components installed within the plurality of circuits, and a plurality of current version numbers of the plurality of current software components;
    determining that the source vehicle and the destination vehicle are suitably close to exchange data through the transceiver via a wireless communications channel;
    comparing the plurality of current version numbers in the destination vehicle with the plurality of approved version numbers in the source vehicle;
    approving an update for one or more of the plurality of current software components in response to one or more criteria;
    receiving one or more of the plurality of approved software components at the destination vehicle from the source vehicle via the wireless communications channel in response to the plurality of current version numbers of the plurality of current software components approved for the update being different from corresponding ones of the plurality of approved version numbers;

updating the one or more of the plurality of current software components in the destination vehicle with the one or more of the plurality of approved software components received from the source vehicle; and transferring from the destination vehicle to the source vehicle a list of the plurality of current software components and the plurality of approved software components installed in the destination vehicle after the update has finished.

11. The method according to claim 10, wherein the one or more criteria includes one or more manual selections of the plurality of current software components to be updated.

12. The method according to claim 10, wherein the one or more criteria includes one or more of a bandwidth of the wireless communications channel, a source throughput of the source vehicle to transmit the plurality of approved software components, a destination throughput of the destination vehicle to receive the plurality of approved software components and perform the updating, a time available to perform the updating, and a priority among the plurality of approved software components.

13. The method according to claim 10, further comprising:
transferring the list from the source vehicle to a repository external to the source vehicle.

14. The method according to claim 10, wherein the list includes a plurality of part numbers of the plurality of circuits in the destination vehicle.

15. The method according to claim 10, wherein at least one of the plurality of approved software components comprises code executable in at least one of the plurality of circuits in the destination vehicle.

16. The method according to claim 10, wherein at least one of the plurality of approved software components comprises calibration information utilized in at least one of the plurality of circuits in the destination vehicle.

17. The method according to claim 10, further comprising:
transferring from the source vehicle to the destination vehicle a lighting condition within the source vehicle; and
automatically applying in the destination vehicle the lighting condition received from the source vehicle.

18. A vehicle comprising:
a transceiver configured to exchange data with a source vehicle via a wireless communications channel;
a plurality of circuits;
a plurality of current software components installed within the plurality of circuits;
a plurality of current version numbers of the plurality of current software components; and
a vehicle task manager configured to:
determine that the source vehicle and the vehicle are suitably close to exchange data through the transceiver via the wireless communications channel, wherein the source vehicle is configured to store a plurality of approved software components and a plurality of approved version numbers;
compare the plurality of current version numbers in the vehicle with the plurality of approved version numbers in the source vehicle;
approve an update for one or more of the plurality of current software components in response to one or more criteria;
receive one or more of the plurality of approved software components at the vehicle from the source vehicle via the wireless communications channel in response to the plurality of current version numbers of the plurality of current software components approved for the update being different from corresponding ones of the plurality of approved version numbers; and
update the one or more of the plurality of current software components in the vehicle with the one or more of the plurality of approved software components received from the source vehicle,
wherein the vehicle is further configured to transfer to the source vehicle a list of the plurality of current software components and the plurality of approved software components installed in the vehicle after the update has finished.

19. The vehicle according to claim 18, wherein the list includes a plurality of part numbers of the plurality of circuits in the vehicle.

20. The vehicle according to claim 18, wherein the one or more criteria includes one or more manual selections of the plurality of current software components to be updated.

* * * * *